United States Patent
Qiao et al.

(10) Patent No.: US 10,984,316 B2
(45) Date of Patent: Apr. 20, 2021

(54) CONTEXT AWARE SENSITIVE INFORMATION DETECTION

(71) Applicant: INTERNATIONAL BUSINESS MACHINES CORPORATION, Armonk, NY (US)

(72) Inventors: Mu Qiao, Belmont, CA (US); Yuya J. Ong, Tenafly, NJ (US); Ramani Routray, San Jose, CA (US); Roger C. Raphael, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 890 days.

(21) Appl. No.: 15/626,566

(22) Filed: Jun. 19, 2017

(65) Prior Publication Data
US 2018/0365560 A1 Dec. 20, 2018

(51) Int. Cl.
*G06N 3/08* (2006.01)
*G06F 21/62* (2013.01)
(Continued)

(52) U.S. Cl.
CPC .......... *G06N 3/08* (2013.01); *G06F 21/6245* (2013.01); *G06F 40/20* (2020.01); *G06F 40/295* (2020.01); *G06N 3/0427* (2013.01); *G06N 3/0445* (2013.01); *G06N 3/0481* (2013.01); *G06N 5/046* (2013.01)

(58) Field of Classification Search
CPC ...... G06N 3/08; G06N 3/0427; G06N 3/0445; G06N 3/0481; G06N 5/046; G06F 40/295; G06F 40/20; G06F 21/6245
See application file for complete search history.

(56) References Cited

U.S. PATENT DOCUMENTS 9,043,247 B1 5/2015 Hart et al.
9,235,562 B1 1/2016 Hart
(Continued)

OTHER PUBLICATIONS

Volkmar Frinken, Andreas Fischer, Markus Baumgartner, and Horst Bunke, "Keyword spotting for self-training of BLSTM NN based handwriting recognition systems", Jul. 10, 2013, Pattern Recognition vol. 47, Issue 3, pp. 1073-1082. (Year: 2013).*

(Continued)

*Primary Examiner* — Kamran Afshar
*Assistant Examiner* — Ying Yu Chen
(74) *Attorney, Agent, or Firm* — Dmitry Paskalov (57) ABSTRACT

A method loads training samples and forms training data set from the training samples. The method uses the bidirectional LSTM recurrent neural network that includes one or more input cells and one or more output cells and trains it with the training data set. The method determines a sensitive information and confidence values based on analyzing a text with the trained neural network. The method selects predicted samples from the text, where the sensitive information confidence value corresponding to a one or more predicted samples is above a threshold value, based on determining that a sensitive information accuracy has improved. The method forms a new training data set, where the new training data set comprises the samples and the verified one or more predicted samples based on the verified one or more predicted samples, and trains the previously trained neural network with the new training data set.

17 Claims, 8 Drawing Sheets

(51) Int. Cl.
  *G06N 3/04* (2006.01)
  *G06F 40/20* (2020.01)
  *G06F 40/295* (2020.01)
  *G06N 5/04* (2006.01)

(56) References Cited

U.S. PATENT DOCUMENTS

| 9,311,499 | B2 | 4/2016 | Redlich et al. |
| 2015/0199405 | A1 | 7/2015 | Redlich et al. |
| 2018/0300608 | A1* | 10/2018 | Sevrens ............. G06N 3/084 |

OTHER PUBLICATIONS

Zhiheng Huang, Wei Xu, and Kai Yu, "Bidirectional LSTM-CRF Models for Sequence Tagging", Aug. 9, 2015, arXiv, pp. 1-10. (Year: 2015).*

Franck Dernoncourt, Ji Young Lee, Ozlem Uzuner, and Peter Szolovits, "De-identification of patient notes with recurrent neural networks", Dec. 31, 2016, Journal of the American Medical Informatics Association, 24(3), pp. 596-606. (Year: 2016).*

Shweta, Asif Ekbal, Sriparna Saha, and Pushpak Bhattacharyya, "Deep Learning Architecture for Patient Data De-identification in Clinical Records" Dec. 2016, Proceedings of the Clinical Natural Language Processing Workshop, pp. 32-41, (Year: 2016).*

Zengjian Liu, Buzhou Tang, Xiaolong Wang, and Qingcai Chen, "De-identification of clinical notes via recurrent neural network and conditional random field", Jun. 1, 2017, Journal of Biomedical Informatics 75 (2017), pp. S34-S42. (Year: 2017).*

Mell et al., "The NIST Definition of Cloud Computing," National Institute of Standards and Technology, Sep. 2011, p. 1-3, Special Publication 800-145.

Soumya S. R. et al., "Data Leakage Prevention System by Context based Keyword Matching and Encrypted Data Detection", International Journal of Advanced Research in Computer Science Engineering and Information Technology, vol. 3, Issue: 1, Jun. 26, 2014, ISSN_No. 2321-3337, pp. 375-384.

Finkel, et al., "Incorporating non-local information into information extraction systems by Gibbs sampling," ACL '05: Proceedings of the 43rd Annual Meeting on Association for Computational Linguistics, Jun. 2005, pp. 363-370, Association for Computational Linguistics, DOI: 10.3115/1219840.1219885, Retrieved from the Internet: <URL: https://dl.acm.org/doi/10.3115/1219840.1219885>.

Hochreiter, et al., "Long Short-Term Memory," Neural Computation, Nov. 15, 1997, pp. 1735-1780, vol. 9, Issue 8, MIT Press, DOI: 10.1162/neco.1997.9.8.1735, Retrieved from the Internet: <URL: https://dl.acm.org/doi/10.1162/neco.1997.9.8.1735>.

Mikolov, et al., "Distributed Representations of Words and Phrases and their Compositionality," NIPS'13: Proceedings of the 26th International Conference on Neural Information Processing Systems, Oct. 16, 2013, 9 pages, arXiv, arXiv: 1310.4546v1, Retrieved from the Internet: <URL: https://www.researchgate.net/publication/257882504_Distributed_Representations_of_Words_and_Phrases_and_their_Compositionality>.

* cited by examiner

CONTEXT AWARE SENSITIVE INFORMATION DETECTION

BACKGROUND

The present invention relates, generally, to the field of computing, and more particularly to natural language processing for data loss prevention of sensitive information.

Natural language processing (NLP) is a field of computer science, artificial intelligence, and computational linguistics related to the interactions between computers and human natural languages such as programming computers to process large natural language corpora.

Sensitive information is a piece of data owned by entities or individuals, which, if potentially lost, damaged or compromised, bares significant financial and integrity damages to the enterprise or person of interest. For example, personal identifiable information (PII), sensitive personal information (SPI), personal health information (PHI), and confidential business information.

Data Loss Prevention (DLP) are software products or services designed to protect sensitive information against malicious or accidental sharing outside of the defined trust zones. For example, in hybrid cloud solutions sensitive information may be transferred from the private cloud to a public cloud.

Hybrid cloud is typically a cloud computing environment that uses a combination of on-premises, private cloud and third-party, public cloud services by synthesizing between the two platforms. The synthesizing is defined as allowing workloads to move between private and public clouds as computing needs and costs change. The hybrid cloud solutions give businesses greater flexibility and more data deployment options.

SUMMARY

According to one embodiment, a method, computer system, and computer program product for detecting sensitive information is provided. The present invention may include a processor-implemented method for detecting sensitive information using bidirectional long short term memory (LSTM) recurrent neural network. The processor-implemented method loads a plurality of positive training samples and forms a training data set from the plurality of positive training samples. The processor-implemented method trains a bidirectional LSTM recurrent neural network with the training data set, where the bidirectional LSTM recurrent neural network comprises one or more input cells and one or more output cells. The processor-implemented method determines a plurality of sensitive information where each one of the plurality of sensitive information has a corresponding predicted confidence value, based on analyzing a text with the trained bidirectional LSTM recurrent neural network. Whenever the processor-implemented method determines that a sensitive information accuracy has improved, processor-implemented method selects a plurality of predicted positive samples from the text, where the sensitive information accuracy is based on a leave out test data set, and where selecting the plurality of predicted positive samples from the text is based on a determination that the corresponding predicted confidence value of each one of the plurality of sensitive information is above a threshold value. The processor-implemented method forms a new training data set, where the new training data set comprises the training data set and the verified plurality of predicted positive samples based on verifying the plurality of predicted positive samples. The processor-implemented method trains the trained bidirectional LSTM recurrent neural network with the new training data set.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it may be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Typically, a neural network is a computational model in computer science that is based on a collection of neural units. Each neural unit is an artificial neuron that may be connected with other neural units to create a neural network. The neural network may be trained to find a solution to a problem where a traditional computer program fails, such as in the field of Natural Language Processing (NLP).

As previously mentioned, embodiments of the present invention relate to the field of computing, and more particularly to Data Loss Prevention (DLP) of sensitive information. The following described exemplary embodiments provide a system, method, and program product to, among other things, training and using a recurrent learning model for DLP capable of dynamically determining context aware sensitive information. Therefore, the present embodiment has the capacity to improve the technical field of NLP and DLP by detecting context aware sensitive information. As described below, the determination of context aware sensitive information may be performed by a previously trained Long Short Term Memory (LSTM) neural network and not by using dictionary or rule based methods.

Typically, detecting sensitive information for DLP purposes are performed by using dictionary or rule based methods. Dictionary based methods are methods that match a list of predefined expressions or keywords to natural language data that has to be examined. For example, a set of keywords "credit card number", "driver's license", and "nationality" if found in the examined data may indicate that sensitive information is disclosed. Rule based methods search the natural language data for expressions representing sensitive information, such as a social security number (SSN), date of birth, and address. For example, determining that the natural language data includes 9 digits in the format "ddd-dd-dddd" or "ddd dd dddd" may indicate that the examined natural language data includes sensitive information.

The dictionary and rule based methods depend on precise rules and a routinely updated dictionary. Nevertheless, the detection accuracy of dictionary and rule based methods are low, especially in unstructured textual documents due to data matching without considerations of the semantic context of the words. For example, if the word "Asian" is defined as private sensitive information in the dictionary based the DLP method, the sentence "Every May is Asian American heritage celebration month" would be detected as including sensitive information. As such, it may be advantageous, among other things, to develop a mechanism for context aware sensitive information detection based on a neural network that may identify sensitive information, such as words, terms, phrases or other entities, from a section of a text, such as sentences or paragraphs.

According to one embodiment, a computer may detect sensitive information by leveraging semantic context information through neural network analysis of natural language data especially by a bidirectional LSTM recurrent neural network that may be instantly trained and significantly improves the accuracy of the context aware sensitive information detection. This embodiment may be used with a hybrid cloud software solution in order to prevent "leaking" of sensitive information from private to public clouds. This mechanism may be advantageous due to lower computational cost and less memory requirements for maintaining and updating the underlining dictionaries and indexes, and, in addition, capable to adapt to the dynamically changing environment by training the model on new data.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a processor-implemented method, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The following described exemplary embodiments provide a system, method, and program product to implement a model based on a bidirectional LSTM recurrent neural network that is capable of being dynamically trained in order to detect context aware sensitive information in natural language data, such as text.

Figure 1:
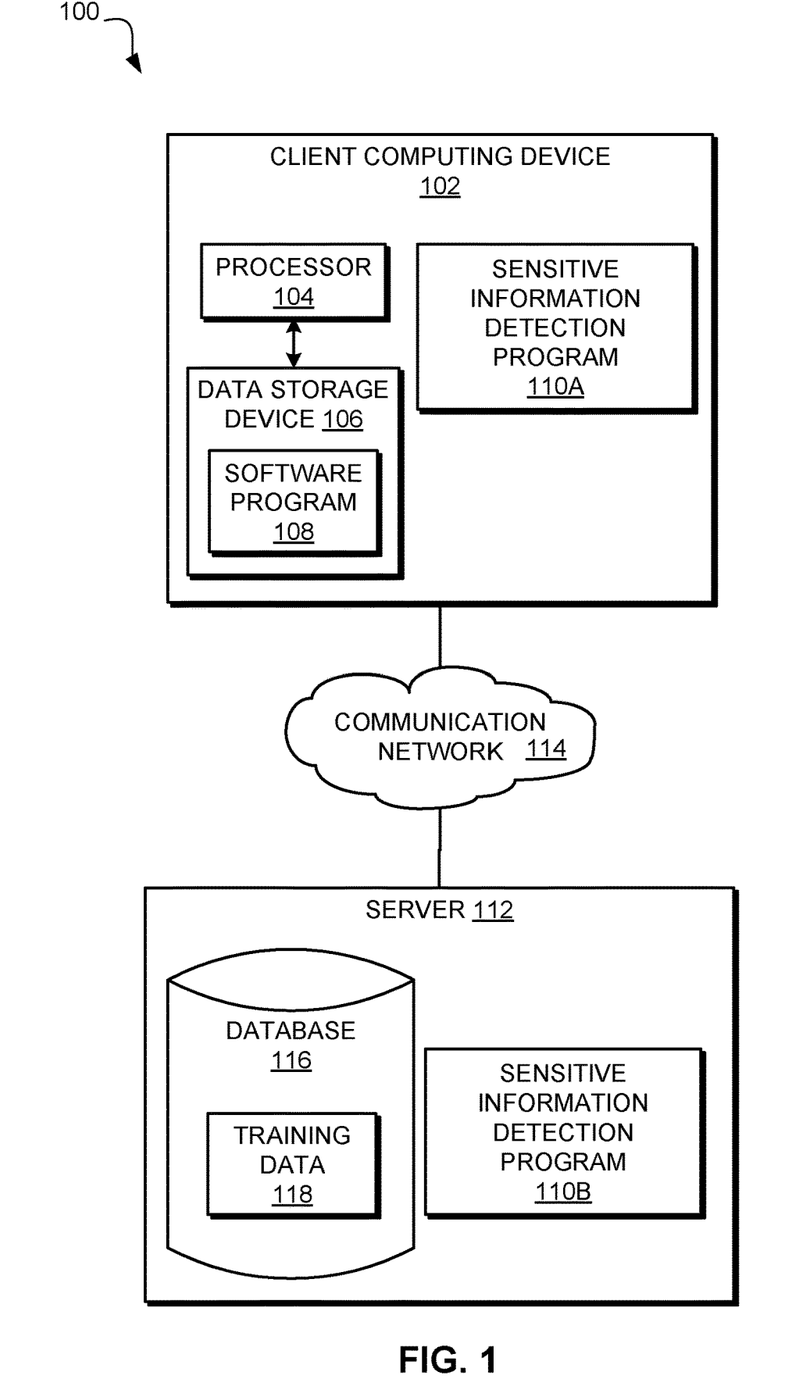
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a sensitive information detection (SID) program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 5, the client computing device 102 may include internal components 502 $a,b$ and external components 504 $a,b$, respectively.

The server computer 112 may be a laptop computer, netbook computer, personal computer (PC), a desktop computer, or any programmable electronic device or any network of programmable electronic devices capable of hosting and running an SID program 110B and a database 116 and communicating with the client computing device 102 via the communication network 114, in accordance with embodiments of the invention. As will be discussed with reference to FIG. 3, the server computer 112 may include internal components 502 $a,b$ and external components 504 $a,b$ respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

Database 116 may be a data repository capable of storing information, such as training data 118. Training data 118 may be a table, matrix or spreadsheet of a set of natural language inputs, such as words, phrases, acronyms, and alphanumeric expressions, representing training samples for the SID program 110A, 110B. According to the present embodiment, training data 118 may include one or more sets of information where each set is related to different sensitive information example or embodiment. For example, training data 118 may include a sentence "IBM® (IBM and all IBM-based trademarks and logos are trademarks or registered trademarks of International Business Machines Corporation and/or its affiliates) is an existing AT&T® customer" (AT&T and all AT&T-based trademarks and logos are trademarks or registered trademarks of AT&T Inc. and/or its affiliates), where "IBM®" and "AT&T®" are intended to be treated as sensitive information tokens when used in the context related to customers. Token may represent a word, phrase, abbreviation or other combination of alphanumeric natural language inputs that may be treated as a sensitive information. In another embodiment, training data 118 may be located on data storage device 106 or loaded using internal components 502 $a,b$ or external components 504 $a,b$.

According to the present embodiment, the SID program 110A, 110B may be a program capable of loading training data 118 from database 116, converting the training data 118 to feature vectors, and load the feature vectors to a bidirectional LSTM neural network as a training data set. The method for converting the training data 118 to feature vectors is explained in further detail below with respect to FIG. 2. The structure of bidirectional LSTM neural network is explained in further detail below with respect to FIGS. 3A and 3B. The method of training and using the bidirectional LSTM neural network is explained in further detail below with respect to FIGS. 4A and 4B.

Figure 2:
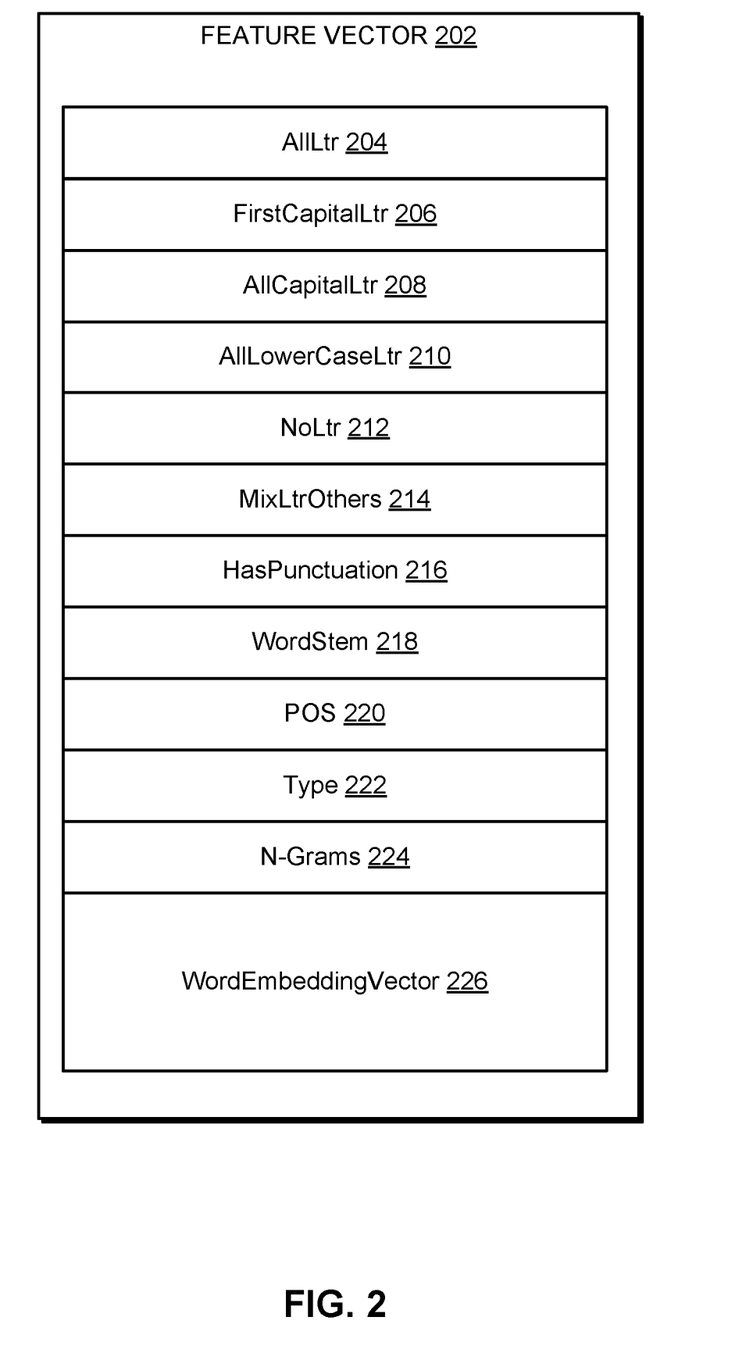
FIG. 2 illustrates an exemplary structure of a feature vector according to at least one embodiment.

Referring now to FIG. 2, an exemplary structure of feature vector 202 is depicted according to at least one embodiment. According to the present embodiment, training data 118 may be divided into tokens where each token may be a word, an abbreviation, a phrase or any combination of alphanumeric natural language inputs, such as letters or numbers. Each token may be transferred into feature vector 202 (i.e. an array of numbers) where each field of the array (particular dimension of the vector) represents a different property of the token. For example, feature vector 202 may be generated to include fields as described in FIG. 2: AllLtr 204 represents whether the token consists of letters only or not (a Boolean value); FirstCapitalLtr 206 represents whether a token starts with a capital letter; AllCapitalLtr 208 represents that all the letters of the token are capitalized; AllLowerCaseLtr 210 represents that all the letters of the token are not capitalized; NoLtr 212 represents that the token does not have letters (i.e. numbers or symbols only); MixLtrOthers 214 represents that the token is a mix of letters and other symbols; HasPunctuation 216 represents that the token has at least one symbol represents punctuation; WordStem 218 represents a stem of the token; POS 220 represents that the token has a part of speech tag (i.e verb, noun); Type 222 represents that the token is of a specific type, such as date, region, religion; N-Grams 224 represents a contiguous sequence of n items from a given token; and WordEmbedding Vector 226. The WordEmbedding Vector 226 is a vector of a token that is determined by an embedding technique, such as "word2vec", dependency-based word embedding, or word clustering or any other method that converts words, phrases, abbreviations and sentences from an alphanumeric expressions to embedding vectors.

Figure 3A:
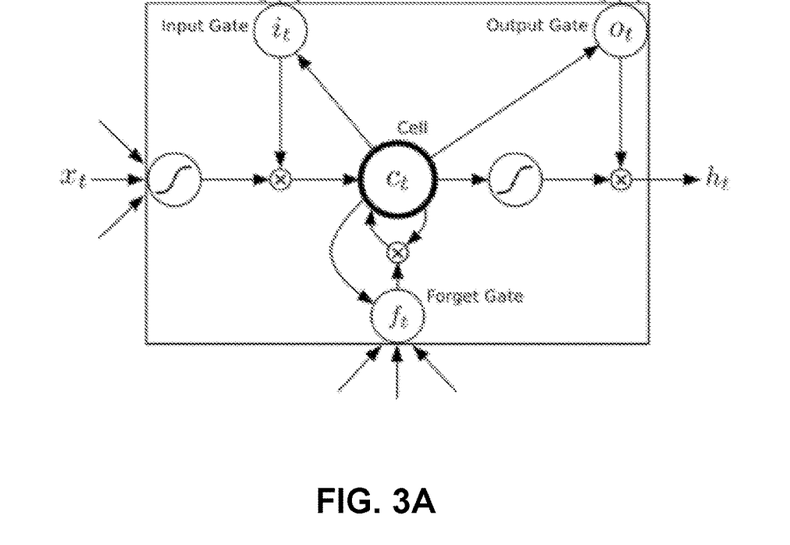
FIG. 3A illustrates an exemplary structure of a Long Short Term Memory (LSTM) neural network cell according to at least one embodiment.

Referring now to FIG. 3A, an exemplary structure of an LSTM neural network cell is depicted. According to the present embodiment, LSTM neural network cell is used in order to overcome a vanishing/exploding gradient problem occurring in recurrent neural networks. The vanishing/exploding gradient problem is a problem that occurs during training of a recurrent neural network where each layer is either less or more affected by the training as a previous layer of cells of the recurrent neural network. For example, suppose the input data at time t is $x_t$ and the hidden state at the previous time step is $h_{t-1}$, then the memory cell at time t has value:

$$c_t = \alpha \otimes c_{t-1} + \beta \otimes g(x_t, h_{t-1}),$$

where $\otimes$ is an element-wise multiplication between two vectors, $c_t$ is a linearly weighted combination between $c_{t-1}$ and $g(x_t, h_{t-1})$ that is computed additively. To prevent c from exploding, g is often associated with a sigmoid or tanh functions. The LSTM memory cell allows another path for the error derivative to flow, and thus solving the vanishing/exploding gradient problem in recurrent neural networks. According to the present embodiment, the LSTM cell may be implemented as:

$$i_t = \sigma(W_{xi}x_t + W_{hi}h_{t-1} + W_{ci}c_{t-1} + b_i)$$

$$f_t = \sigma(W_{xf}x_t + W_{hf}h_{t-1} + W_{cf}c_{t-1} + b_f)$$

$$c_t = f_t \otimes c_{t-1} + i_t \otimes g(x_t, h_{t-1})$$

$$g(x_t, h_{t-1}) = \tanh(W_{xc}x_t + W_{hc}h_{t-1} + b_c)$$

$$o_t = \sigma(W_{xo}x_t + W_{ho}h_{t-1} + W_{co}c_{t-1} + b_o)$$

$$h_t = o_t \otimes \tanh(c_t),$$

where $\sigma$ is a logistic sigmoid function, i is an input gate, f is a forget gate, and o is an output gate, and c are cell vectors, and where W's are the weight matrices indicating the weights among the gates.

Figure 3B:
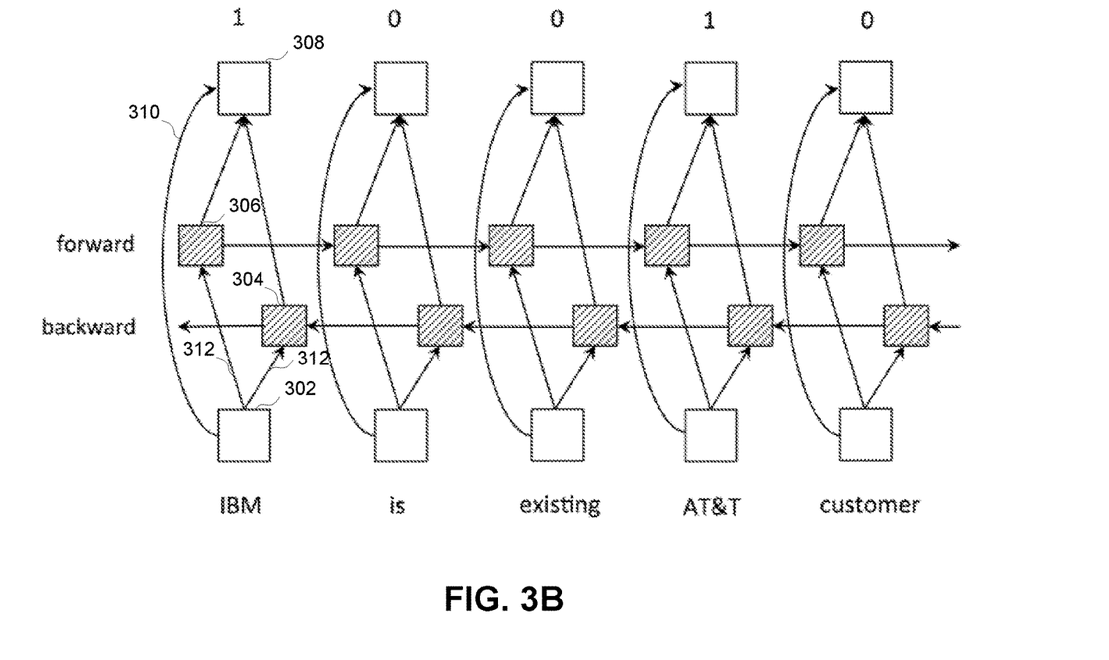
FIG. 3B illustrates an exemplary structure of a bidirectional LSTM neural network according to at least one embodiment.

Referring now to FIG. 3B, an exemplary structure of a bidirectional LSTM recurrent neural network is depicted. According to the present embodiment, cell 302 represents an input cell that receives a token converted to a feature vector 202. For example, cell 302 may receive feature vector 202 of a token that represents word "IBM®". Cell 304 may represent a backward hidden layer of the bidirectional LSTM recurrent neural network while cell 306 may represent a regular (forward) layer of the bidirectional LSTM recurrent neural network hidden layer. Both forward and backward passes may leverage the contextual information of each token. Cell 308 may represent an output layer of LSTM recurrent neural network. The output of cell 308 may be either "1" or "0" that represents whether the token represents sensitive information or not. In another embodiment, cell 308 may be accompanied by a probability value representing a confidence level that the token represents sensitive information. For example, cell 308 can be implemented using a softmax activation function. In order to improve the learning process of the LSTM recurrent neural network, feature vector 202 may be divided into 2 feature vectors where the first part of the feature vector 202 may be transferred via connector 310 to an output cell 308 while the remaining part of the feature vector 202 is transferred via connectors 312 to the hidden layers. For example, feature vector 202 may be divided into a WordEmbedding Vector 226 that is transferred to the inner layer cells 304 and 306 while the remaining part is transferred via connector 310 directly to an output cell 308.

Figure 4A:
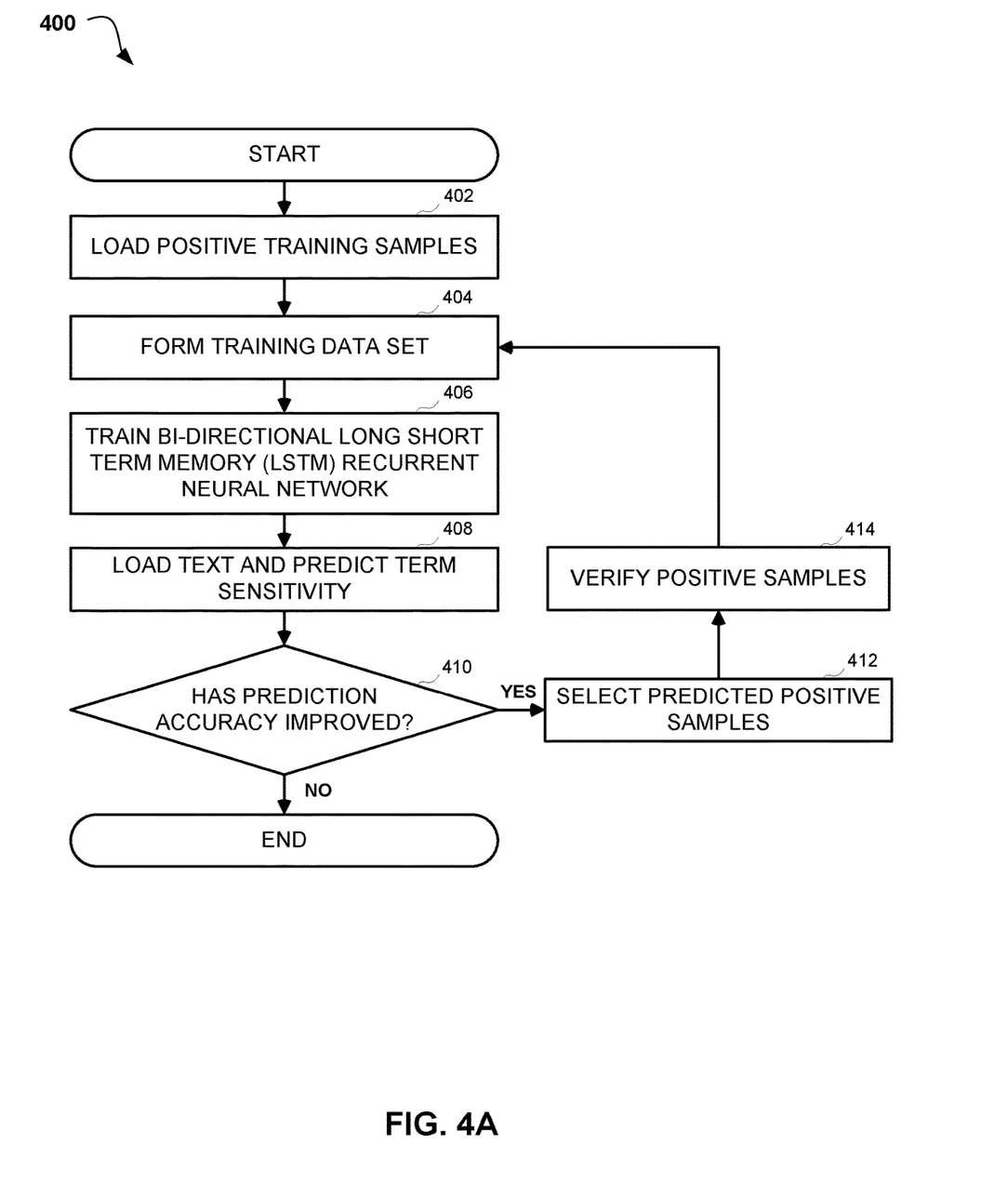
FIG. 4A is an operational flowchart illustrating a method for training the sensitive information detection (SID) program.

Referring now to FIG. 4A an operational flowchart illustrating a method 400 for training SID program 110A, 110B is depicted, according to at least one embodiment. At 402, the SID program 110A, 110B loads positive training samples. According to the present embodiment, the SID program 110A, 110B may load training samples from training data 118. Training data 118 may be a natural language data, such as a text document containing sentences or phrases that include context related sensitive information inputs. In addition, each token is marked whether the token is a sensitive information token. For example, each sentence or word may be accompanied by the corresponding bit array representing that the word is a sensitive information. For example, the sentence "IBM® is existing AT&T® customer" may be accompanied by a bit array of "10010" representing that the first and the fourth words of the sentence are sensitive information tokens.

Next, at 404, SID program 110A, 110B forms a training data set. According to the present embodiment, the SID program 110A, 110B may convert each sentence into tokens. Afterwards each token is transferred to feature vector in a format of feature vector 202. For example, each token may be transferred into a feature vector 202 by using a Named Entity Recognizer (NER) described with respect to FIG. 2 and Word2Vec word embedding methods.

Next, at 406, the SID program 110A, 110B trains bidirectional LSTM recurrent neural network. According to the present embodiment, the SID program 110A, 110B may train the bidirectional LSTM recurrent neural network with the training data set that consists of feature vectors such as vector 202. In another embodiment, in order to improve training, SID program 110A, 110B may divide the feature vectors into two parts, such as a word embedding vector and a vector based from NER parameters and transfer the vector based on NER parameters to a corresponding output cell of the bidirectional LSTM recurrent neural network while transferring the word embedding vector to a corresponding input cell of the bidirectional LSTM recurrent neural network as depicted in FIG. 3B.

Next, at 408, the SID program 110A, 110B loads a text and predicts term sensitivity. According to the present embodiment, the SID program 110A, 110B may receive a natural language data, such as a text either from storage devices, such as data storage device 106, database 116, internal components 502, or external components 504 a,b. For example, a natural language data may be a document that was typed by a user using external components 504 a,b, such as keyboard 542. The natural language data is converted into a set of feature vectors and transferred to the bidirectional LSTM recurrent neural network that returns for each feature vector whether the feature vector represents a sensitive information. Additionally, the bidirectional LSTM recurrent neural network may return an accuracy metric on a leave out test data set (a model validation technique for assessing how the results of a statistical analysis will generalize to an independent data set) after each training. The accuracy may be determined either from probability or precision factors of the evaluation made by the bidirectional LSTM recurrent neural network. The precision, for example, may be determined using the equation $t_p/(t_p+f_p)$ where $t_p$ is the number of true positives and $f_p$ is the number of false positives. According to the present embodiment, SID program 110A, 110B may store the accuracy values after each training.

Then, at 410, the SID program 110A, 110B determines whether prediction accuracy has improved. According to the present embodiment SID program 110A, 110B determines the detection accuracy after analyzing the text (natural language data) and compares it with the stored accuracy determined after the training. If the SID program 110A, 110B determines that the current accuracy is not within a range from the stored accuracy (step 410, "YES" branch), the SID program 110A, 110B may continue to step 412 to select predicted positive samples. Positive samples may include one or more sentences, containing predicted sensitive information such as paragraph, passage, or text. If the SID program 110A, 110B determines that the current accuracy is within a range from the stored accuracy (step 410, "NO" branch), the SID program 110A, 110B may terminate.

Next, at 412, the SID program 110A, 110B selects predicted positive samples. According to the present embodiment, the SID program 110A, 110B may select positive samples from the text that have an confidence metric above a predetermined confidence threshold. The confidence threshold value may be adjusted by a user. For example, if an input to the trained bidirectional LSTM neural network of the sentence "IBM® is existing AT&T® customer" returns that "IBM®" and "AT&T®" are sensitive information tokens and the confidence of the detection accompanied to "IBM®" and "AT&T®" feature vectors is 0.86, in case that the confidence threshold value is set to 0.85, the SID program 110A, 110B may select the sentence as a predicted positive sample for future training of the neural network.

Next, at 412, the SID program 110A, 110B verifies positive samples. According to the present embodiment, the SID program 110A, 110B may display the selected predicted positive samples to a user and may allow the user to verify and select the specific tokens that represent sensitive information. For example, a user may select with a pointing device that the words "IBM®" and "AT&T®" are sensitive information and SID program 110A, 110B would use this positive sample for further training of the bidirectional LSTM recurrent neural network.

Figure 4B:
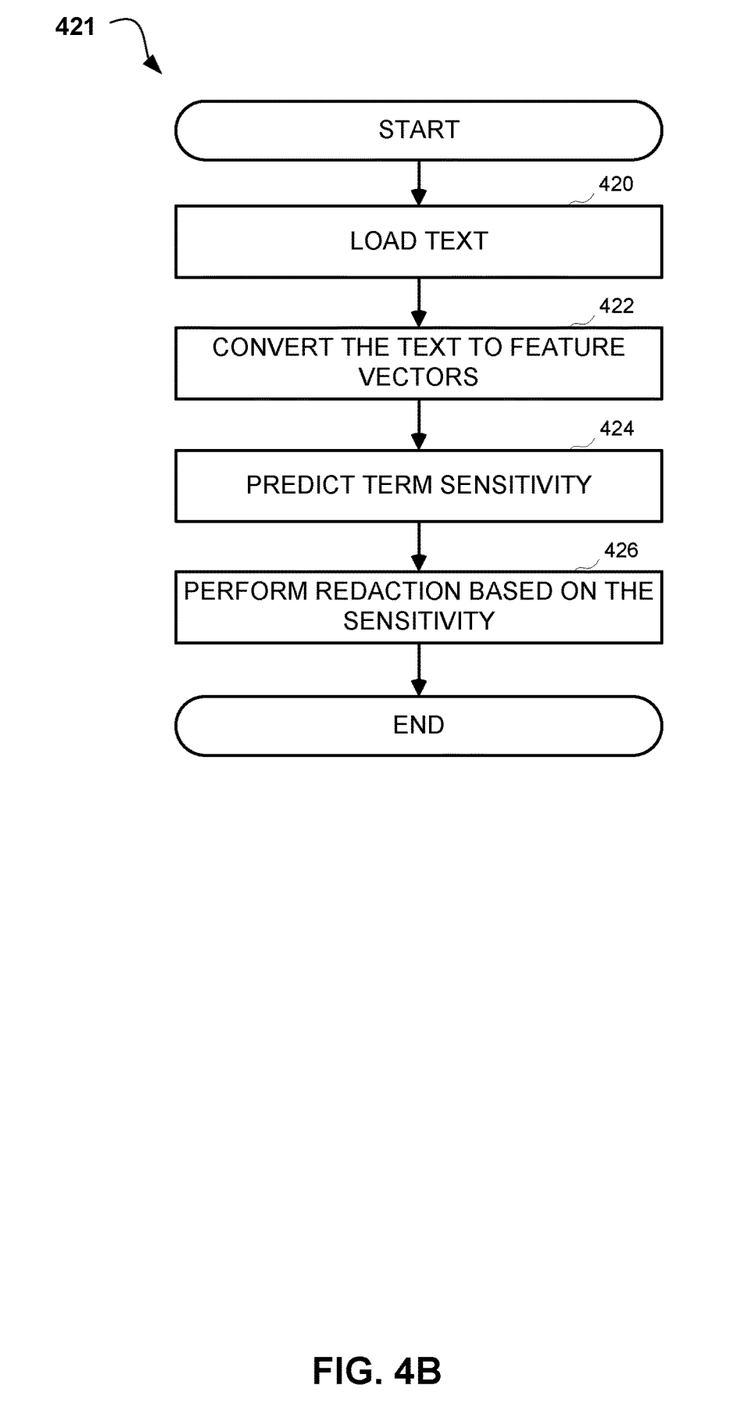
FIG. 4B is an operational flowchart illustrating a method for using the trained SID program for detecting sensitive information according to at least one embodiment.

Referring now to FIG. 4B, an operational flowchart illustrating a method for using the trained SID program 110A, 110B for detecting sensitive information. The method 421 may be either combined with process 400 as one software application or executed as a standalone process after the accuracy value is above a value determined by a user. At 420, the SID program 110A, 110B loads a text (a new text). According to the present embodiment, the SID program 110A, 110B may load the text for sensitive information detection. The text may be any digital document that includes natural language and is capable of being transformed into feature vectors, such as feature vector 202. According to the present embodiment, the SID program 110A, 110B may receive the text either from storage devices, such as data storage device 106, database 116, internal components 502, or external components 504 a,b. For example, the text may be a document that was typed by a user using external components 504 a,b, such as keyboard 542.

Next, at 422, the SID program 110A, 110B converts the text to feature vectors, such as vector 202. As previously mentioned, the SID program 110A, 110B may convert the text to the feature vectors using a word embedding model, such as NER, "word2vec", dependency-based word embedding, word clustering, or other method that converts words, phrases and sentences from the loaded text into word embedding space.

Next, at 424, the SID program 110A, 110B predicts sensitivity of the text. According to the present embodiment, the SID program 110A, 110B may divide the text into sentences and tokens and determine whether each token is sensitive information and an accuracy of the determination.

Next, at 426, the SID program 110A, 110B performs redaction based on the sensitivity. According to present embodiment, the SID program 110A, 110B may delete the tokens that are predicted sensitive and have predicted confidence values above a threshold confidence value determined by a user. For example, if a sentence "IBM® is existing AT&T® customer" returns a predicted confidence value of 0.86 that "IBM®" and "AT&T®" are sensitive information and the user confidence threshold value is 0.85, SID program 110A, 110B would delete these tokens from the text. In another embodiment, SID program 110A, 110B may substitute a sensitive information token with a non-sensitive equivalent that has no extrinsic or exploitable meaning or value but may map back to the sensitive data through a mapping system.

The present embodiment may determine an answer to a targeted question (a given relationship) with a very small number of training examples. Typically, about 40 training examples may be required for the process to provide reliable candidate answers. This is in comparison to several thousands of training examples required for alternative machine learning systems designed to identify relationships.

It may be appreciated that FIGS. 4A and 4B provide only an illustration of one implementation and does not imply any limitations with regard to how different embodiments may be implemented. Many modifications to the depicted environments may be made based on design and implementation requirements.

More specifically, the process may be used to train a regular (not bidirectional) LSTM recurrent neural network and the trained neural network may be used for detection of any content specific tokens required for NLP.

Figure 5:
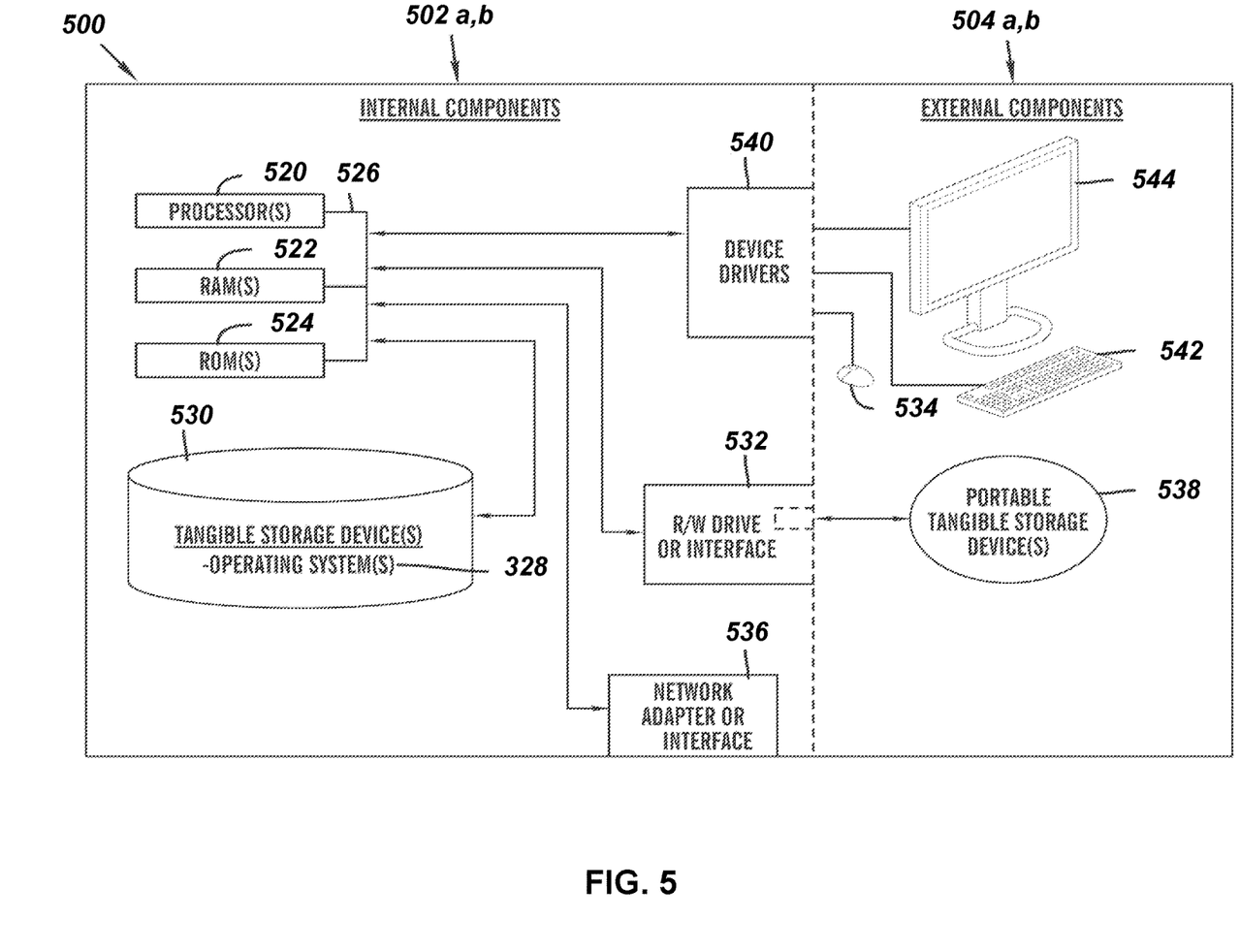
FIG. 5 is a block diagram of internal and external components of computers and servers depicted in FIG. 1 according to at least one embodiment.

FIG. 5 is a block diagram 500 of internal and external components of the client computing device 102 and the server 112 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 502 a,b and external components 504 a,b illustrated in FIG. 5. Each of the sets of internal components 502 a,b include one or more processors 520, one or more computer-readable RAMs 522, and one or more computer-readable ROMs 524 on one or more buses 526, and one or more operating systems 528 and one or more computer-readable tangible storage devices 530. The one or more operating systems 528, the software program 108 and the SID program 110A in the client computing device 102, and the SID program 110B in the server 112 are stored on one or more of the respective computer-readable tangible storage devices 530 for execution by one or more of the respective processors 320 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that may store a computer program and digital information.

Each set of internal components 502 a,b also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as the cognitive screen protection program 110A, 110B, may be stored on one or more of the respective portable computer-readable tangible storage devices 538, read via the respective R/W drive or interface 532, and loaded into the respective hard drive 530.

Each set of internal components 502 a,b may also include network adapters or interfaces 536 such as a TCP/IP adapter cards, wireless Wi-Fi interface cards, or 3G or 4G wireless interface cards or other wired or wireless communication links. The software program 108 and the SID program 110A in the client computing device 102 and the SID program 110B in the server 112 may be downloaded to the client computing device 102 and the server 112 from an external computer via a network (for example, the Internet, a local area network or other, wide area network) and respective network adapters or interfaces 536. From the network adapters or interfaces 536, the software program 108 and the SID program 110A in the client computing device 102 and the SID program 110B in the server 112 are loaded into the respective hard drive 530. The network may comprise copper wires, optical fibers, wireless transmission, routers, firewalls, switches, gateway computers and/or edge servers.

Each of the sets of external components 504 a,b may include a computer display monitor 544, a keyboard 542, and a computer mouse 534. External components 504 a,b may also include touch screens, virtual keyboards, touch pads, pointing devices, and other human interface devices. Each of the sets of internal components 502 a,b also includes device drivers 540 to interface to computer display monitor 544, keyboard 542, and computer mouse 534. The device drivers 540, R/W drive or interface 532, and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that may be rapidly provisioned and released with minimal management effort or interaction with a provider of the service. This cloud model may include at least five characteristics, at least three service models, and at least four deployment models.

Characteristics are as follows:

On-demand self-service: a cloud consumer may unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities may be rapidly and elastically provisioned, in some cases automatically, to quickly scale out and rapidly released to quickly scale in. To the consumer, the capabilities available for provisioning often appear to be unlimited and may be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage may be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which may include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
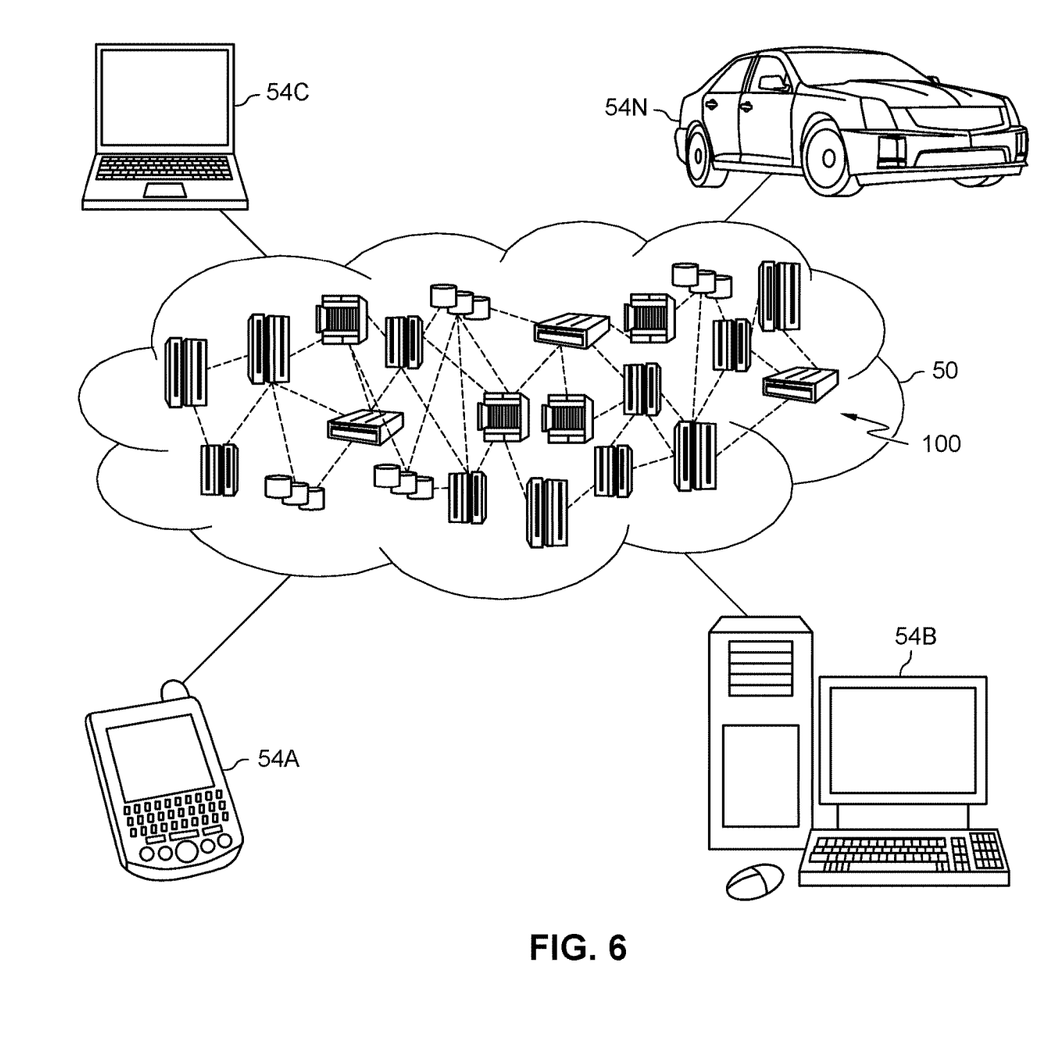
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 100 and cloud computing environment 50 may communicate with any type of computerized device over any type of network and/or network addressable connection (e.g., using a web browser).

Figure 7:
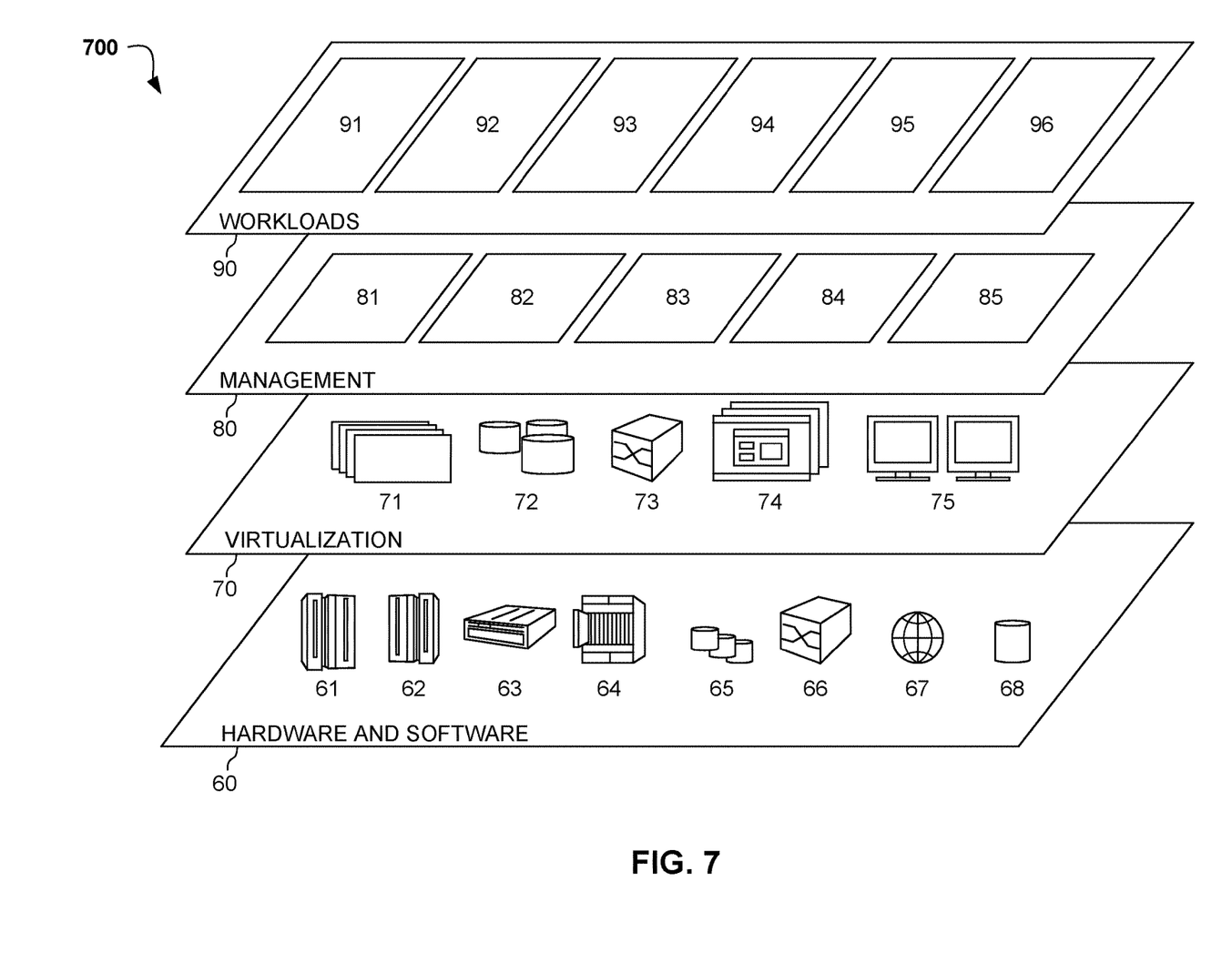
FIG. 7 depicts abstraction model layers according to an embodiment of the present invention.

Referring now to FIG. 7, a set of functional abstraction layers 700 provided by cloud computing environment 50 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and sensitive information detection processing 96. Sensitive information detection processing 96 may relate to training a bidirectional LSTM recurrent neural network with positive examples of context related sensitive information sentences and using the model to detect and protect sensitive information.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for detecting a plurality of information by a bidirectional Long Short Term Memory (LSTM) recurrent neural network, the method comprising:
    loading a plurality of positive training samples, wherein the plurality of positive training samples comprise a plurality of sentences in a natural language;
    converting the plurality of sentences into a plurality of tokens;
    forming a training data set from the plurality of positive training samples by converting each of the plurality of tokens into a set of feature vectors, wherein the set of feature vectors comprise a set of word embedding vectors with a set of named entity recognizer (NER) array vectors;
    training the bidirectional LSTM recurrent neural network with the training data set, wherein the bidirectional LSTM recurrent neural network comprises input cells, hidden layer cells, and output cells, and wherein the set of word embedding vectors transferred to the hidden layer cells, the set of feature vectors transferred to the input cells, and the set of NER array vectors transferred to the output cells;
    based on analyzing a text with the trained bidirectional LSTM recurrent neural network, determining a plurality of information, wherein each one of the plurality of information has a corresponding predicted confidence value;
    based on determining that an information accuracy has improved, selecting a plurality of predicted positive samples from the text, wherein the information accuracy is based on a leave out test data set, and wherein selecting the plurality of predicted positive samples from the text is based on determining that the corresponding value of each of the plurality of information is above a threshold value;
    based on verifying the plurality of predicted positive samples, forming a new training data set, wherein the new training data set comprises the training data set and the verified plurality of predicted positive samples; and
    training the trained bidirectional LSTM recurrent neural network with the new training data set.

2. The method of claim 1, wherein converting the plurality of sentences into the plurality of tokens further comprises:
    converting each of the plurality of sentences to a set of tokens;
    converting the set of tokens to a set of feature vectors; and
    forming the training data set from the set of feature vectors.

3. The method of claim 2, wherein converting the set of tokens to the set of feature vectors further comprises:
    generating a plurality of feature vectors, wherein each one of the plurality of feature vectors comprises:
        an embedding array determined from applying a Word2Vec method to the set of tokens; and
        a named entity recognizer (NER) array determined from the set of tokens by applying an NER method to the set of tokens.

4. The method of claim 3, wherein training a bidirectional LSTM recurrent neural network with the positive training data set further comprises:
    transferring the embedding array to the one or more input cells of the bidirectional LSTM recurrent neural network; and
    transferring the NER array to the one or more output cells of the bidirectional LSTM recurrent neural network.

5. The method of claim 3, wherein the NER array comprises a group of features consisting of: whether each one of the set of tokens comprises letters only, whether each one of the set of tokens has a capitalized letter, whether each one of the set of tokens has all letters capitalized, whether each one of the set of tokens has all lowercase letters, whether each one of the set of tokens has no letters, whether each one of the set of tokens has a mix of letters and numbers, and whether each one of the set of tokens has punctuation symbols.

6. The method of claim 1, further comprising:
    based on not determining that the information accuracy improved, analyzing a new text with the trained bidirectional LSTM recurrent neural network for the information;
    performing redaction of the information in the new text.

7. A computer system for detecting a plurality of information by a bidirectional Long Short Term Memory (LSTM) recurrent neural network, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    loading a plurality of positive training samples, wherein the plurality of positive training samples comprise a plurality of sentences in a natural language;
    converting the plurality of sentences into a plurality of tokens;
    forming a training data set from the plurality of positive training samples by converting each of the plurality of tokens into a set of feature vectors, wherein the set of feature vectors comprise a set of word embedding vectors with a set of named entity recognizer (NER) array vectors;
    training the bidirectional LSTM recurrent neural network with the training data set, wherein the bidirectional LSTM recurrent neural network comprises input cells, hidden layer cells, and output cells, and wherein the set of word embedding vectors transferred to the hidden layer cells, the set of feature vectors transferred to the input cells, and the set of NER array vectors transferred to the output cells;
    based on analyzing a text with the trained bidirectional LSTM recurrent neural network, determining a plurality of information, wherein each one of the plurality of information has a corresponding predicted confidence value;
    based on determining that an information accuracy has improved, selecting a plurality of predicted positive samples from the text, wherein the information accuracy is based on a leave out test data set, and wherein selecting the plurality of predicted positive samples from the text is based on determining that the corresponding value of each of the plurality of information is above a threshold value;
    based on verifying the plurality of predicted positive samples, forming a new training data set, wherein the new training data set comprises the training data set and the verified plurality of predicted positive samples; and training the trained bidirectional LSTM recurrent neural network with the new training data set.

8. The computer system of claim 7, wherein converting the plurality of sentences into the plurality of tokens further comprises:

converting each of the plurality of sentences to a set of tokens;

converting the set of tokens to a set of feature vectors; and forming the training data set from the set of feature vectors.

9. The computer system of claim 8, wherein converting the set of tokens to the set of feature vectors further comprises:

generating a plurality of feature vectors, wherein each one of the plurality of feature vectors comprises:
an embedding array determined from applying a Word2Vec method to the set of tokens; and
a named entity recognizer (NER) array determined from the set of tokens by applying an NER method to the set of tokens.

10. The computer system of claim 9, wherein training a bidirectional LSTM recurrent neural network with the positive training data set further comprises:

transferring the embedding array to the one or more input cells of the bidirectional LSTM recurrent neural network; and transferring the NER array to the one or more output cells of the bidirectional LSTM recurrent neural network.

11. The computer system of claim 9, wherein the NER array comprises a group of features consisting of: whether each one of the set of tokens comprises letters only, whether each one of the set of tokens has a capitalized letter, whether each one of the set of tokens has all letters capitalized, whether each one of the set of tokens has all lowercase letters, whether each one of the set of tokens has no letters, whether each one of the set of tokens has a mix of letters and numbers, and whether each one of the set of tokens has punctuation symbols.

12. The computer system of claim 7, further comprising:

based on not determining that the information accuracy improved, analyzing a new text with the trained bidirectional LSTM recurrent neural network for the information;

performing redaction of the information in the new text.

13. A computer program product for detecting a plurality of information, the computer program product comprising:

one or more computer-readable tangible storage medium and program instructions stored on at least one of the one or more tangible storage medium, the program instructions executable by a processor, the program instructions comprising:

program instructions to load a plurality of positive training samples, wherein the plurality of positive training samples comprise a plurality of sentences in a natural language;

program instructions to convert the plurality of sentences into a plurality of tokens;

program instructions to form a training data set from the plurality of positive training samples by converting each of the plurality of tokens into a set of feature vectors, wherein the set of feature vectors comprise a set of word embedding vectors with a set of named entity recognizer (NER) array vectors;

program instructions to train the bidirectional LSTM recurrent neural network with the training data set, wherein the bidirectional LSTM recurrent neural network comprises input cells, hidden layer cells, and output cells, and wherein the set of word embedding vectors transferred to the hidden layer cells, the set of feature vectors transferred to the input cells, and the set of NER array vectors transferred to the output cells;

based on analyzing a text with the trained bidirectional LSTM recurrent neural network, program instructions to determine a plurality of information wherein each one of the plurality of information has a corresponding predicted confidence value;

based on determining that an information accuracy has improved, selecting a plurality of predicted positive samples from the text, wherein the information accuracy is based on a leave out test data set, and wherein selecting the plurality of predicted positive samples from the text is based on determining that the corresponding value of each of the plurality of information is above a threshold value;

based on verifying the plurality of predicted positive samples, program instructions to form a new training data set, wherein the new training data set comprises the training data set and the verified plurality of predicted positive samples; and training the trained bidirectional LSTM recurrent neural network with the new training data set.

14. The computer program product of claim 13, wherein program instructions to convert the plurality of sentences into the plurality of tokens further comprises:

program instructions to convert each of the plurality of sentences to a set of tokens;

program instructions to convert the set of tokens to a set of feature vectors; and program instructions to form the training data set from the set of feature vectors.

15. The computer program product of claim 14, wherein program instructions to convert the set of tokens to the set of feature vectors further comprises:

program instructions to generate a plurality of feature vectors, wherein each one of the plurality of feature vectors comprises:
an embedding array determined from applying a Word2Vec method to the set of tokens; and
a named entity recognizer (NER) array determined from the set of tokens by applying an NER method to the set of tokens.

16. The computer program product of claim 15, wherein program instructions to train a bidirectional LSTM recurrent neural network with the positive training data set further comprises:

program instructions to transfer the embedding array to the one or more input cells of the bidirectional LSTM recurrent neural network; and program instructions to transfer the NER array to the one or more output cells of the bidirectional LSTM recurrent neural network.

17. The computer program product of claim 15, wherein the NER array comprises a group of features consisting of: whether each one of the set of tokens comprises letters only, whether each one of the set of tokens has a capitalized letter, whether each one of the set of tokens has all letters capitalized, whether each one of the set of tokens has all lowercase letters, whether each one of the set of tokens has no letters, whether each one of the set of tokens has a mix of letters and numbers, and whether each one of the set of tokens has punctuation symbols.

* * * * *